United States Patent Office 3,816,418
Patented June 11, 1974

3,816,418
TRIMERIZATION OF NITRILES
Gordon H. Miller, Richmond, Va., assignor to
Texaco Inc., New York, N.Y.
No Drawing. Filed Dec. 29, 1972, Ser. No. 319,581
Int. Cl. C07d 55/50
U.S. Cl. 260—248 CS
13 Claims

ABSTRACT OF THE DISCLOSURE

Aromatic nitriles, such as terephthalonitrile, isophthalonitrile, benzonitrile, etc., are trimerized to the corresponding 1,3,5-triazine by heating the nitrile in the presence of metal ferri- or ferrocyanide.

BACKGROUND OF THE INVENTION

Field of the invention

This invention relates to a process for preparing 1,3,5-triazines in high yield by trimerization of aromatic nitriles. More particularly this invention relates to an improved process for the conversion of aromatic nitriles to the corresponding aromatic substituted 1,3,5-triazines in which the nitriles are heated with a catalyst at a temperature of about 180 to about 450.

Description of the prior art

The preparation of 1,3,5-triazines from aromatic nitriles, such as benzonitrile, etc., has been described in the literature. Trimerization of aromatic nitriles, for example, can be carried out catalytically or by employing heat alone or heat and pressure. A wide variety of catalysts are known including hydrides and amides of the alkali metals and alkaline earth metals, sulfuric acid, zinc diethyl, bromine, metallic sodium, zinc chloride, aluminum chloride, titanium tetrachloride, antimony trichloride, nickel chloride, copper chloride, beryllium chloride, bismuth oxychloride, manganese chloride, cobalt chloride, manganese bromide, cobalt bromide, copper acetate, manganese acetate, vanadyl chloride, etc. A number of other catalysts are described by Toland in U.S. Pat. 3,060,179, by Johns in U.S. Pat. 3,502,579 and by Karguin et al. in U.S. Pat. 3,164,555.

All of the processes of the prior art for the preparation of 1,3,5-triazines by trimerization of the corresponding aromatic nitriles suffer from a number of disadvantages. Most of the previously proposed processes are tedious to operate, a long reaction time is generally required and it has been found especially difficult to conveniently remove the unconverted nitrile from the 1,3,5-triazine product. Toland in U.S. Pat. 3,060,179 removes unreacted nitrile from the reaction mixture by solvent extraction and then, at very high temperatures (i.e., from 400 to 500° C.) and at a relatively slow rate sublimes the trimer overhead.

BRIEF DESCRIPTION OF THE INVENTION

This invention relates to a process for the preparation of 1,3,5-triazines by heating an aromatic nitrile in the presence of an iron or alkali metal ferri- or ferrocyanide catalyst.

DETAILED DESCRIPTION OF THE INVENTION

The process of this invention is applicable to the conversion of a wide variety of aromatic nitriles, including mononitriles, dinitriles and other polynitriles, to form aromatic substituted 1,3,5-triazines.

Nitriles useful as starting materials in the process of this invention include, for example, compounds of the formula:

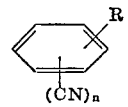

(I)

wherein R is selected from the group consisting of hydrogen, alkyl of from 1 to 10 inclusive carbon atoms as exemplified by methyl, ethyl, propyl, pentyl, heptyl, octyl and isomers thereof, amino, nitro, hydroxyl, carboxyl and halogen selected from the group consisting of chlorine, fluorine, iodine and bromine, and $n$ is an integer of from 1 to 4 inclusive.

Among the nitriles which are suitable as starting materials in the method of this invention are benzonitrile,
2-toluonitrile,
3-toluonitrile,
4-toluonitrile,
4-aminobenzonitrile,
3-aminobenzonitrile,
3-ethylbenzonitrile,
4-t-butylbenzonitrile,
3-hydroxybenzonitrile,
3-nitrobenzonitrile,
4-ethyl-2-nitrobenzonitrile,
2-hydroxy-3-propylbenzonitrile,
3-phenylbenzonitrile,
2,4-dimethylbenzonitrile,
2,6-diethylbenzonitrile,
3-chlorobenzonitrile,
4-bromobenzonitrile,
3-fluorobenzonitrile,
1-naphthonitrile,
2-naphthonitrile,
3-naphthonitrile,
3-methyl-1-naphthonitrile,
3-chloro-1-naphthonitrile,
4-nitro-1-naphthonitrile,
2-hydroxy-1-naphthonitrile,
4-hydroxy-2-methyl-1-naphthonitrile,
4-fluoro-2-naphthonitrile,
orthophthalonitrile,
isophthalonitrile,
terephthalonitrile,
3-methyl-1,4-dicyanobenzene,
5-isopropyl-1,3-dicyanobenzene,
2,5-dimethyl-1,4-dicyanobenzene,
2-chloro-1,3-dicyanobenzene,
5-bromo-1,4-dicyanobenzene,
3-nitro-1-2-dicyanobenzene,
4-hydroxy-1,3-dicyanobenzene,
2-(dichloromethyl)-1,3-dicyanobenzene,
5-(chloromethyl)-2-ethyl-3-chloro-1,4-dicyanobenzene,
3-nitro-1,2-dicyanobenzene,
1,3,5-tricyanobenzene,
2-chloro-1,3,5-tricyanobenzene,
3-fluoro-1,4,5-tricyanobenzene,
6-nitro-1,3,5-tricyanobenzene,
4-hydroxy-1,2,3-tricyanobenzene,
4-methyl-1,3,5-tricyanobenzene, 1,2,4,5-tetracyanobenzene,
3-hydroxy-1,2,4,5-tetracyanobenzene,
2-bromo-1,3,4,5-tetracyanobenzene,
3-nitro-1,2,4,5-tetracyanobenzene,
2-isopropyl-1,3,4,5-tetracyanobenzene and
3-n-pentyl-1,2,4,5-tetracyanobenzene.

Mixtures of the above-mentioned aromatic nitriles, such as a mixture of about 66 percent by weight of isophthalonitrile and about 34 percent by weight of terephthalonitrile can be employed in this process, if desired.

An especially suitable group of starting materials includes nitriles of the formula (I) above where $n$ is an integer of from 1 to 2 inclusive. Examples of materials in this last-mentioned category include isophthalonitrile (i.e., 1,3-dicyanobenzene) and terephthalonitrile (i.e., 1,4-dicyanobenzene). In addition to the examples shown above, other substituted nitriles can be employed, for example, those containing groups derived from a carboxyl group, such as carboxylic salts, amides and esters as well as sulfone and sulfonic acid groups. In this specification the term nitrile is used to refer to compounds having one or more cyano groups attached to the carbon atoms of the aromatic ring.

In this process the temperature at which the trimerization reaction is conducted can be varied over a wide range. Generally, the temperature employed will be from about 180 to about 450, and preferably, from about 200 to about 425° C. The reaction time will vary widely depending upon the nature of specific nitrile used and the reaction conditions employed, although a satisfactory yield of the product can be achieved in about 0.1 to 20 hours or more. Preferably, the reaction mixture is agitated either by a mechanical stirrer or agitator, a platform rocker or a similar device.

Although only a catalytic amount of the particular catalyst utilized is required in this process, generally the quantity of the catalyst employed will be from about 0.1 percent by weight up to about 50 percent by weight based on the weight of the nitrile charged to the reactor and preferably will be from about 0.1 percent by weight up to about 20 percent by weight on the same basis. Preferably, the reaction is carried out in the absence of air or in the presence of an inert gas which can be, for example, nitrogen, argon, helium, etc. Mixtures of these same inert gases may be employed if desired. The process of this invention can be conducted under a pressure less than atmospheric or pressures of about atmospheric to about 2000 p.s.i. may be utilized. Preferably, the pressure will be from about atmospheric to about 500 p.s.i.

Catalysts suitable for use in the process of this invention include the metal ferri- and ferrocyanides. Examples of such catalysts include:

(1) ferric ferrocyanide
(2) ferrous ferrocyanide
(3) cupric ferrocyanide
(4) zinc ferrocyanide
(5) sodium ferrocyanide
(6) potassium ferrocyanide
(7) calcium ferrocyanide
(8) barium ferrocyanide
(9) lithium ferrocyanide
(10) ferrous ferricyanide
(11) ferric ferricyanide
(12) cuprous ferricyanide
(13) sodium ferricyanide
(14) potassium ferricyanide
(15) calcium ferricyanide
(16) magnesium ferricyanide
(17) lithium ferricyanide, and
(18) mixtures of the above-listed catalysts.

The iron ferri- and ferrocyanides selected from the group consisting of ferrous ferrocyanide, ferrous ferricyanide, ferric ferricyanide and ferric ferrocyanide as well as the alkali metal ferri- and ferrocyanides selected from the group consisting of potassium ferrocyanide, potassium ferricyanide, sodium ferrocyanide and sodium ferricyanide constitute a particularly valuable group of catalysts for the process of this invention.

In addition to the anhydrous catalysts etc., the hydrous species of these same materials may be employed if desired. Generally, the size of the catalyst will be from about 1/8 inch down to about 400 mesh. No special pretreatment of the catalyst is required.

An important facet of this invention is that after the conversion operation has been completed the unreacted nitrile may be removed overhead from the reaction mixture by sublimation, leaving as bottoms the trimer which is available for further polymerization to a B-stage (partially cured) polymer and to the fully cured polymeric product. This sublimation scheme can be applied to purification of the trimer product whether the reaction is carried out at atmospheric or at higher pressures. Alternatively the unreacted nitrile can be removed from the reaction mixture by extraction with a solvent such as ethyl ether, acetone, acetonitrile, etc.

It is economically advantageous to conduct the reaction under pressure, so that when the trimer conversion is optimum the temperature can be maintained while the pressure is reduced to atmospheric or to a partial vacuum. If desired, an inert gas can be employed in the sublimation operation and in this case the inert gas or mixture of inert gases may be blown through the heated reaction mixture to sublime out all of the unconverted monomer.

The catalysts employed in the process of this invention being non-volatile materials will remain in the trimer product at the conclusion of the sublimation operation or at the conclusion of the trimerization reaction and in the case of an aromatic substituted 1,3,5-triazine formed from a dinitrile, the trimer product with the initially included catalyst, together with added catalyst, if necessary, may then be employed to prepare a B-stage polymer, following which the product may be cured to a final state. Such non-volatile catalysts may be removed from the trimer before or after sublimation by a solvent wash with materials such as acetone, acetonitrile, ethyl ether, water, ammonium hydroxide, etc.

The triazine products of this invention prepared from dinitriles can, as previously pointed out, be further polymerized in the presence of suitable catalysts such as titanium tetrachloride, zinc chloride, boron trichloride, etc. at temperatures of about 450° to about 500° C. or more to form B-stage or partially polymerized polymers which in a final operation can be molded and completely cured at about 2000 p.s.i. for 4 hours at 450° C., for example, to form thermo-thermoset, high temperature resistant polymeric products useful for a wide variety of applications such as in the preparation of high temperature resistant materials, etc., as more completely described in Miller application entitled Polymerization of Aromatic Nitriles, Ser. No. 177,169, filed Sept. 1, 1971, which is incorporated herein in its entirety. The completely cured products can be machined to produce a wide variety of parts such as housings, liners and impellers for pumps useful for handling a number of organic liquids, such as alcohols, ketones, ethers, amines, etc. When compounded with glass fibers, asbestos, etc., the B-stage resins can be employed in preparing solvent resistant pipe suitable for carrying methyl alcohol, ethyl alcohol, acetone and corrosive gases, such as chlorine, etc. The 1,3,5-triazine products of this invention can also be employed in preparing heat resistant semiconductor materials as more fully described in Karguin et al., U.S. Pat. 3,164,555.

Typical of the 1,3,5-triazine products formed by the process of this invention is 2,4,6-tris (3-cyanophenyl)-

1,3,5-triazine (II) prepared from isophthalonitrile. The formula of I is as follows:

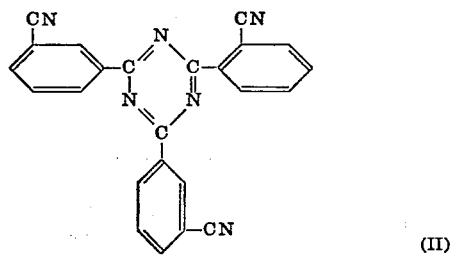

(II)

The products of this invention are insoluble in most organic solvents; however, they exhibit limited solubility in hot xylene, acetonitrile and acetone, etc.

The following examples illustrate various embodiments of this invention and are to be considered not limitative.

EXAMPLE I

In this example 1,3-dicyanobenzene was trimerized using potassium ferricyanide as catalyst. The reaction was carried out in a stainless steel tube ⅜ in. diameter by 5 in. length, with cap fittings at each end. The materials were weighed into the tube which was then evacuated, back filled with nitrogen and sealed after which the tube was placed on a rocking mechanism arranged to run at approximately 10 r.p.m. The assembly was placed in a preheated oven and was maintained at 400° C. for 4 hours. After the tube had been removed from the oven, cooled and opened, the contents were removed for analysis.

Details relating to this example are set out below:

TABLE 1

Charge

| | |
|---|---|
| 1,3-dicyanobenzene (g.) | 1.6754 |
| Potassium Ferricyanide (g.) | 0.0835 |
| Weight percent of catalyst | 4.75 |

Product

| | |
|---|---|
| Weight of product recovered (plus catalyst) (g.) | 1.7375 |
| Weight of product (g.) | 1.6540 |
| Weight percent trimer [a] | 100 |
| Yield (percent based on weight of 1,3-dicyanobenzene charged) | 98.5 |

[a] Identified by infrared analysis as 2,4,6-tris (3-cyanophenyl)-1,3,5-triazine.

| | Elemental analysis | |
|---|---|---|
| | Theory ($C_{24}H_{12}N_6$) | Trimer sample |
| Carbon | 74.99 | 75.39 |
| Hydrogen | 3.15 | 3.51 |
| Nitrogen | 21.86 | 21.10 |

EXAMPLE II

Ferric ferrocyanide was employed as a catalyst in the trimerization of 1,3-dicyanobenzene in this example as a catalyst. The same equipment and procedure was used as in the previous example. Catalyst amount was 5.03 weight percent and the mixture was heated at 400° C. for 4 hours. Yield and analysis data are shown in Table 2.

TABLE 2

Charge

| | |
|---|---|
| 1,3-dicyanobenzene (g.) | 1.6044 |
| Ferric ferrocyanide (g.) | 0.0850 |
| Weight percent of catalyst | 5.03 |

Product

| | |
|---|---|
| Weight of product recovered (plus catalyst) (g.) | 1.6655 |
| Weight of product (g.) | 1.5805 |
| Weight percent trimer [a] | 90 |
| Yield (percent based on weight of 1,3-dicyanobenzene charged) | 88.7 |

[a] Identified by infrared analysis as 2,4,6-tris (3-cyanophenyl)-1,3,5-triazine.

| | Elemental analysis | |
|---|---|---|
| | Theory ($C_{24}H_{12}N_6$) | Trimer sample |
| Carbon | 74.99 | 74.06 |
| Hydrogen | 3.15 | 3.75 |
| Nitrogen | 21.10 | 22.19 |

What is claimed is:

1. A process for preparing an aromatic substituted 1,3,5-triazine which comprises:
   (A) heating an aromatic nitrile at a temperature of from about 180 to about 450° C. in the presence of a catalyst selected from the group consisting of metal ferri- and ferrocyanides.

2. The process of claim 1 wherein the unconverted nitrile is removed from the triazine product by sublimation.

3. The process of claim 1 wherein the unconverted nitrile is removed from the triazine product by extraction with a solvent.

4. The process of claim 1 wherein the said nitrile is heated in the presence of a catalyst at a temperature of from about 180 to about 450° C.

5. The process of claim 1 wherein the catalyst is selected from the group consisting of:
   (a) ferrous ferricyanide
   (b) ferrous ferrocyanide
   (c) ferric ferricyanide
   (d) ferric ferrocyanide
   and mixtures thereof.

6. The process of claim 1 wherein the catalyst is selected from the group consisting of:
   (a) sodium ferricyanide
   (b) sodium ferrocyanide
   (c) potassium ferricyanide
   (d) potassium ferrocyanide,
   and mixtures thereof.

7. The process of claim 1 wherein the catalyst is removed from the formed 1,3,5-triazine product by extraction with a solvent.

8. The process of claim 1 wherein said aromatic nitrile has the formula:

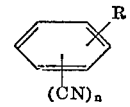

wherein R is selected from the group consisting of hydrogen, alkyl of from 1 to 10 inclusive carbon atoms, amino, nitro, hydroxy, carboxyl and halogen, and $n$ is an integer of from 1 to 4 inclusive.

9. The method of claim 1 wherein the said aromatic nitrile has the formula:

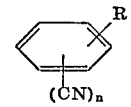

wherein R is selected from the group consisting of hydrogen, alkyl of from 1 to 10 inclusive carbon atoms, amino, nitro, hydroxyl, carboxyl and halogen and $n$ is an integer of from 1 to 2 inclusive.

10. The process of claim 1 wherein the said nitrile is isophthalonitrile.

11. The process of claim 1 wherein from about 0.1 to about 50 weight percent of the said catalyst is employed based on the weight of the nitrile.

12. The process for the preparation of 2,4,6-tris(3-cyanophenyl)-1,3,5-triazine which comprises heating isophthalonitrile at a temperature of from about 180 to about 450° C. in the presence of ferric ferrocyanide and removing the unconverted isophthalonitrile from the triazine product by sublimation.

13. The process for the preparation of 2,4,6-tris(3-cyanophenyl), 1,3,5-triazine which comprises heating isophthalonitrile in the presence of potassium ferricyanide at a temperature of from about 180 to about 450° C. and removing the unconverted isophthalonitrile from the triazine product by sublimation.

References Cited

UNITED STATES PATENTS 3,763,115  10/1973  Miller _____ 260—248 X

JOHN M. FORD, Primary Examiner